US012573788B2

(12) United States Patent
Matsuoka

(10) Patent No.: US 12,573,788 B2
(45) Date of Patent: Mar. 10, 2026

(54) CONNECTOR

(71) Applicant: SUMITOMO WIRING SYSTEMS, LTD., Mie (JP)

(72) Inventor: Hiroyuki Matsuoka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 307 days.

(21) Appl. No.: 18/563,446

(22) PCT Filed: Jun. 3, 2022

(86) PCT No.: PCT/JP2022/022577

§ 371 (c)(1),
(2) Date: Nov. 22, 2023

(87) PCT Pub. No.: WO2022/255475

PCT Pub. Date: Dec. 8, 2022

(65) Prior Publication Data

US 2024/0250471 A1 Jul. 25, 2024

(30) Foreign Application Priority Data

Jun. 4, 2021 (JP) ................................ 2021-094662

(51) Int. Cl.
*H01R 13/52* (2006.01)
*H01R 13/74* (2006.01)

(52) U.S. Cl.
CPC ..... *H01R 13/5213* (2013.01); *H01R 13/5227* (2013.01); *H01R 13/748* (2013.01); *H01R 2201/26* (2013.01)

(58) Field of Classification Search
None
See application file for complete search history.

(56) References Cited

U.S. PATENT DOCUMENTS 7,618,275 B2 * 11/2009 Owen, Sr. ............... F21S 45/37
439/699.2
10,320,114 B2 * 6/2019 Suzuki ................. H01R 13/502
(Continued)

FOREIGN PATENT DOCUMENTS

JP 2017-084928 A 5/2017
WO WO-2019111923 A1 * 6/2019 ........... H05K 5/0247

OTHER PUBLICATIONS

International Search Report issued on Jul. 19, 2022 for WO 2022/255475 A1 (4 pages).

*Primary Examiner* — Tho D Ta
(74) *Attorney, Agent, or Firm* — Venjuris, P.C.

(57) ABSTRACT

A connector according to the present disclosure is provided with a plurality of terminals, a plurality of wires, a housing including a tubular portion having an opening, and a cover for covering the opening by being inserted into the tubular portion. The cover includes a cover body having a vent, and a breathable film for covering the vent. The cover body includes an inner wall surrounding an outer periphery of the breathable film and an outer wall located on an outer peripheral side of the inner wall and surrounding an outer peripheral edge of the cover body. The inner wall includes an inner discharge port allowing communication between inside and outside of the inner wall in a direction orthogonal to a Z-axis direction. The outer wall includes an outer discharge port allowing communication between inside and outside of the outer wall in a direction orthogonal to the Z-axis direction.

12 Claims, 12 Drawing Sheets

(56) References Cited

U.S. PATENT DOCUMENTS

| | | | | |
|---|---|---|---|---|
| 2018/0312123 | A1* | 11/2018 | Umemura | H05K 5/0247 |
| 2020/0083634 | A1* | 3/2020 | Ito | H01R 13/46 |
| 2024/0250470 | A1* | 7/2024 | Matsuoka | H01R 13/74 |
| 2024/0266777 | A1* | 8/2024 | Matsuoka | H01R 13/504 |

* cited by examiner

CONNECTOR

CROSS REFERENCE TO RELATED APPLICATIONS

This application is a national phase of PCT application No. PCT/JP2022/022577, filed on 3 Jun. 2022, which claims priority from Japanese patent application No. 2021-094662, filed on 4 Jun. 2021, all of which are incorporated herein by reference.

TECHNICAL FIELD

The present disclosure relates to a connector.

BACKGROUND

Conventionally, a connector to be connected to an electric device for vehicle is known (see, for example, Patent Document 1). A connector described in Patent Document 1 is provided with a plurality of terminal-equipped wires, a housing made of resin and having the plurality of terminal-equipped wires embedded therein, and a sealing cover for covering the housing.

The housing includes a tubular receptacle provided with an opening for exposing terminals.

The sealing cover is provided with a cover body for covering the opening of the receptacle, a breathable film, and a shield shell made of metal and to be assembled with the cover body. The cover body includes a fitting portion to be fit into the receptacle. The fitting portion is provided with a vent penetrating therethrough in an axial direction of the receptacle. The breathable film covers the vent. The breathable film has waterproofness and breathability. The passage of gases through the vent is allowed and the passage of liquids is inhibited by the breathable film.

An annular surrounding wall portion projecting in the axial direction is provided around the vent. The touch of worker's fingers with the breathable film, for example, during an assembling operation of the shield shell and the cover body, is suppressed by the surrounding wall portion.

PRIOR ART DOCUMENT

Patent Document

Patent Document 1: JP 2017-092069 A

SUMMARY OF THE INVENTION

Problems to be Solved

A liquid such as water may intrude between the cover body and the shield shell. If such a liquid intrudes into an inner peripheral side of the surrounding wall portion, this liquid may stay on the surface of the breathable film.

The present disclosure aims to provide a connector capable of suppressing the stay of a liquid on a breathable film.

Means to Solve the Problem

The present disclosure is directed to a connector with a plurality of terminals parallel to each other, a plurality of wires to be respectively connected to the plurality of terminals, a housing made of resin and including a tubular portion having an opening for exposing end parts of the plurality of terminals and a holding portion projecting from the tubular portion toward an outer peripheral side of the tubular portion, the holding portion holding the plurality of terminals and the plurality of wires, and a cover for covering the opening by being inserted into the tubular portion, the end part of each terminal being provided with a bolt hole, the bolt hole penetrating in an axial direction of the tubular portion, a bolt being inserted into the bolt hole, the cover including a cover body made of resin, the cover body having a vent penetrating in the axial direction, the cover body covering the opening, and a breathable film for covering the vent from a side opposite to the plurality of terminals in the axial direction, the breathable film allowing passage of gases and inhibiting passage of liquids, the cover body including an inner wall surrounding an outer periphery of the breathable film and an outer wall located on an outer peripheral side of the inner wall and including an outer peripheral edge of the cover body, the inner wall including an inner discharge port allowing communication between inside and outside of the inner wall in a direction orthogonal to the axial direction, the outer wall including an outer discharge port allowing communication between inside and outside of the outer wall in a direction orthogonal to the axial direction, and the inner discharge port facing an inner peripheral surface of the outer wall, the outer discharge port facing an outer peripheral surface of the inner wall.

Effect of the Invention

According to the present disclosure, the stay of a liquid on a breathable film can be suppressed.

DETAILED DESCRIPTION TO EXECUTE THE INVENTION

[Description of Embodiments of Present Disclosure]

Figure 1:
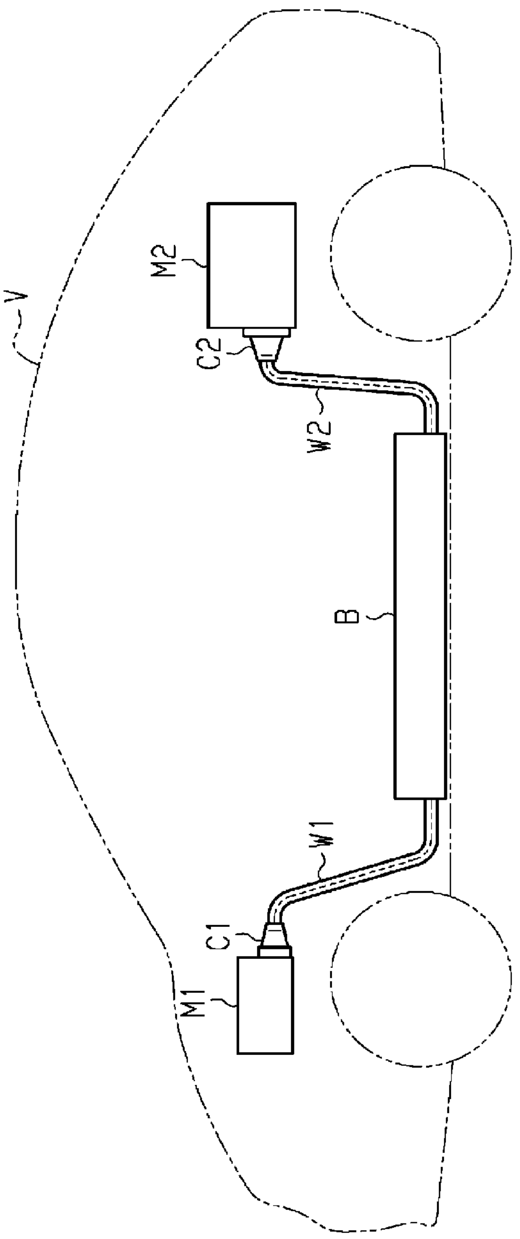
FIG. 1 is a diagram of a vehicle equipped with connectors of one embodiment.

First, embodiments of the present disclosure are listed and described.

[1] The connector of the present disclosure is provided with a plurality of terminals parallel to each other, a plurality of wires to be respectively connected to the plurality of terminals, a housing made of resin and including a tubular portion having an opening for exposing end parts of the plurality of terminals and a holding portion projecting from the tubular portion toward an outer peripheral side of the tubular portion, the holding portion holding the plurality of terminals and the plurality of wires, and a cover for covering the opening by being inserted into the tubular portion, the end part of each terminal being provided with a bolt hole, the bolt hole penetrating in an axial direction of the tubular portion, a bolt being inserted into the bolt hole, the cover including a cover body made of resin, the cover body having a vent penetrating in the axial direction, the cover body covering the opening, and a breathable film for covering the vent from a side opposite to the plurality of terminals in the axial direction, the breathable film allowing passage of gases and inhibiting passage of liquids, the cover body including an inner wall surrounding an outer periphery of the breathable film and an outer wall located on an outer peripheral side of the inner wall and including an outer peripheral edge of the cover body, the inner wall including an inner discharge port allowing communication between inside and outside of the inner wall in a direction orthogonal to the axial direction, the outer wall including an outer discharge port allowing communication between inside and outside of the outer wall in a direction orthogonal to the axial direction, and the inner discharge port facing an inner peripheral surface of the outer wall, the outer discharge port facing an outer peripheral surface of the inner wall.

According to this configuration, if a liquid intrudes into an inner peripheral side of the inner wall, this liquid is easily discharged to the outer peripheral side of the inner wall through the inner discharge port. Further, if a liquid intrudes into an inner peripheral side of the outer wall, this liquid is easily discharged to an outer peripheral side of the outer wall through the outer discharge port. Here, the inner discharge port is facing the inner peripheral surface of the outer wall, and the outer discharge port is facing the outer peripheral surface of the inner wall. Thus, for example, if a liquid intrudes into the inner peripheral side of the outer wall through the discharge port, this liquid is less likely to directly reach the inner discharge port. In this way, the liquid is less likely to intrude into the inner peripheral side of the inner wall. From the above, the stay of the liquid on the breathable film can be suppressed.

[2] Preferably, if a virtual axis extending in a communicating direction of the inner discharge port is a first virtual axis and a virtual axis extending in a communicating direction of the outer discharge port is a second virtual axis, the entire inner discharge port is provided closer to a side where the outer discharge port is located than an intersection of the first and second virtual axes in an axial direction of the second virtual axis.

According to this configuration, if the connector is arranged in such a posture that the outer discharge port is open downward in a vertical direction, the inner discharge port is open obliquely downward. In this way, the liquid having intruded into the inner peripheral side of the inner wall is easily discharged to the outer peripheral side of the inner wall through the inner discharge port by the weight thereof. At this time, since the outer discharge port is open downward, the liquid discharged from the inner discharge port is easily discharged to the outer peripheral side of the outer wall through the outer discharge port by the weight thereof. Therefore, an effect of suppressing the stay of the liquid on the breathable film can be made more noticeable by arranging the connector in the above posture.

[3] Preferably, the inner wall has a first end edge and a second end edge forming the inner discharge port, the first end edge is located closer to the outer discharge port than the second end edge, the inner wall is provided with an extending portion extending to include the first end edge, and the extending portion extends obliquely to the second virtual axis to approach the outer discharge port in the axial direction of the second virtual axis toward the first end edge.

According to this configuration, if the connector is arranged in such a posture that the outer discharge port is open downward in the vertical direction, the extending portion extends obliquely downward. In this way, the liquid having intruded into the inner peripheral side of the inner wall flows obliquely downward along the extending portion after reaching the extending portion by the weight thereof. In this way, the liquid having intruded into the inner peripheral side of the inner wall is easily discharged to the outer peripheral side of the inner wall through the inner discharge port. Therefore, the effect of suppressing the stay of the liquid on the breathable film can be made even more noticeable by arranging the connector in the above posture.

[4] Preferably, a shield shell is provided which is made of metal and covers an outer periphery of the tubular portion, and the shield shell covers the outer discharge port from the outer peripheral side of the outer wall.

According to this configuration, the outer discharge port is covered by the shield shell from the outer peripheral side of the outer wall. In this way, the liquid is less likely to intrude from the outer peripheral side into the inner peripheral surface of the outer wall through the outer discharge port. Therefore, it can be suppressed that the liquid reaches the breathable film.

[5] Preferably, the cover body includes a separation wall located between two mutually adjacent ones of the terminals.

According to this configuration, since the separation wall is located between the two mutually adjacent ones of the terminals, these two terminals can be suitably insulated from each other. Further, an insulation distance between the two terminals can be reduced as compared to the case of using a cover body including no separation wall. Therefore, an increase in the size of the connector in a parallel direction of the plurality of terminals can be suppressed.

[6] Preferably, the cover body includes a facing wall located on a side opposite to the separation wall across one terminal fitting and facing the separation wall, and a coupling wall located on a side opposite to the holding portion across the one terminal and coupling the separation wall and the facing wall, and the coupling wall is configured to restrict insertion of the cover into the tubular portion by contacting the terminal if the cover is inserted into the tubular portion while being inverted about a center axis of the tubular portion with respect to a proper posture.

According to this configuration, if the cover is inserted into the tubular portion while being inverted about the center axis of the tubular portion with respect to the proper posture, the insertion of the cover into the tubular portion is restricted by the contact of the coupling wall with the terminal. In this way, a worker easily notices the erroneous assembling of the cover with the tubular portion.

[7] Preferably, each terminal includes a first extending portion extending from the holding portion toward inside of the tubular portion, a second extending portion extending in the axial direction from the first extending portion and a third extending portion extending from the second extending portion toward a side opposite to the first extending portion in an extending direction of the first extending portion and provided with the bolt hole, and the cover body includes a second coupling wall located between the first coupling wall and the second extending portion and coupling the separation wall and the facing wall when the coupling wall is a first coupling wall.

According to this configuration, the separation wall and the facing wall are coupled by both the first coupling wall and the second coupling wall. The second coupling wall is located between the first coupling wall and the second extending portion of the terminal. From these, the separation wall and the facing wall can be improved in strength while the interference of the second coupling wall and the terminal is avoided.

[8] Preferably, the housing includes a rib coupling an outer surface of a part of the holding portion located between two mutually adjacent ones of the terminals and an outer surface of the tubular portion.

According to this configuration, since the holding portion and the tubular portion are coupled by the rib, the tilt of the holding portion with respect to the tubular portion can be suppressed.

[9] Preferably, the rib includes a recess.

According to this configuration, a part of a mold is arranged in a space where the recess is formed and a resin material for constituting the housing is filled around this part during the injection molding of the housing. Thus, the rib is cooled by causing a refrigerant to flow inside the part of the mold. Since the rib can be solidified earlier than other parts in this way, the tilt of the holding portion with respect to the tubular portion can be suppressed. Therefore, a reduction in the dimensional accuracy of the housing can be suppressed.

Further, according to the above configuration, since the rib includes the recess, the amount of the resin material used for the housing can be reduced and the housing can be reduced in weight.

[10] Preferably, an interlock connector for electrically detecting whether or not the housing is connected to a connection target at a proper position is provided inside the tubular portion, and the interlock connector is provided in parallel to the plurality of terminals in a parallel direction of the plurality of terminals.

According to this configuration, the plurality of terminals and the interlock connector are provided in parallel in the parallel direction of the plurality of terminals. Thus, as compared to the case where the terminals and the interlock connector are arranged in parallel in a direction intersecting both the parallel direction and the axial direction, an increase in the size of the housing in the intersecting direction can be suppressed.

[11] Preferably, the cover body includes an accommodating portion for accommodating one end of the interlock connector, and the accommodating portion is configured to restrict insertion of the cover into the tubular portion by contacting the terminal if the cover is inserted into the tubular portion while being inverted about a center axis of the tubular portion with respect to a proper posture.

According to this configuration, if the cover is inserted into the tubular portion while being inverted about the center axis of the tubular portion with respect to the proper posture, the insertion of the cover into the tubular portion is restricted by the contact of the accommodating portion with the terminal. In this way, the worker easily notices the erroneous assembling of the cover with the tubular portion.

[12] Preferably, the tubular portion includes a partition wall partitioning inside of the tubular portion between the plurality of terminals and the interlock connector.

According to this configuration, since the partition wall is provided inside the tubular portion, an insulation distance between the plurality of terminals and the interlock connector can be reduced as compared to the case where the partition wall is not provided. Therefore, an increase in the size of the connector in the parallel direction of the plurality of terminals can be suppressed.

[Details of Embodiment of Present Disclosure]

A specific example of a connector of the present disclosure is described below with reference to the drawings. For the convenience of description, some components may be shown in an exaggerated or simplified manner in each drawing. Further, a dimension ratio of each part may be different in each figure. Note that the present disclosure is not limited to these illustrations, but is represented by claims and intended to include all changes in the scope of claims and in the meaning and scope of equivalents. "Orthogonal" in this specification means not only strictly orthogonal, but also substantially orthogonal within a range in which functions and effects in this embodiment are achieved.

(Configurations of Wiring Harnesses W1, W2)

As shown in FIG. 1, wiring harnesses W1, W2 are routed in a vehicle V. The wiring harness W1 electrically connects, for example, an electric device M1 such as a motor arranged in a front part of the vehicle V and a battery B arranged in a floor part of the vehicle V. The wiring harness W2 electrically connects, for example, an electric device M2 such as a motor arranged in a rear part of the vehicle V and the battery B.

A connector C1 to be connected to the electric device M1 is provided on an end part of the wiring harness W1. A connector C2 to be connected to the electric device M2 is provided on an end part of the wiring harness W2. The configuration of the connector C1 and that of the connector C2 may be the same or may be different from each other. The electric device M1 corresponds to a "connection target".

(Configuration of Connector C1)

Figure 2:
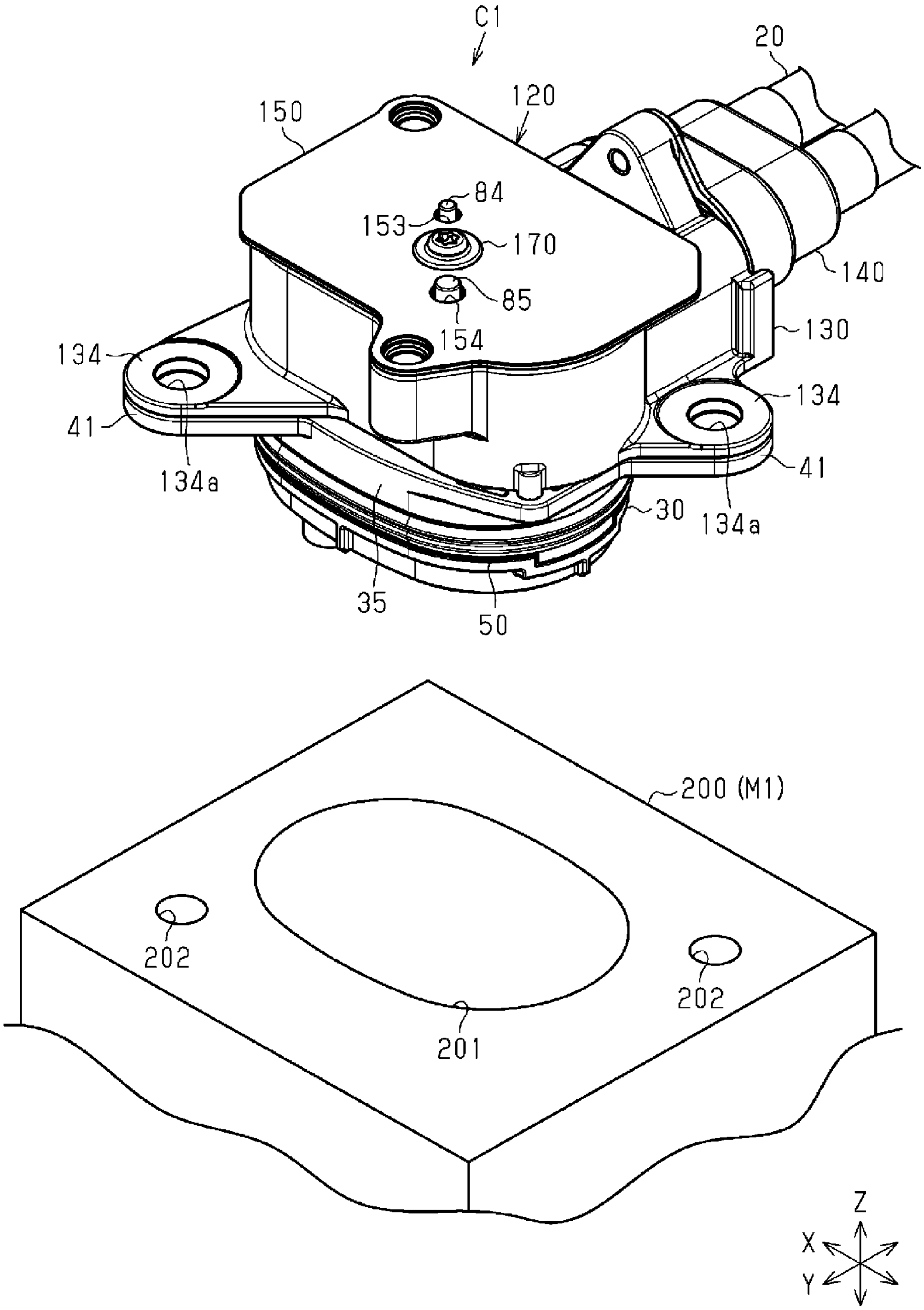
FIG. 2 is a perspective view of the connector.

As shown in FIG. 2, the connector C1 is mounted on a case 200 of the electric device M1 while being partially inserted into an insertion hole 201 provided in the case 200.

Figure 3:
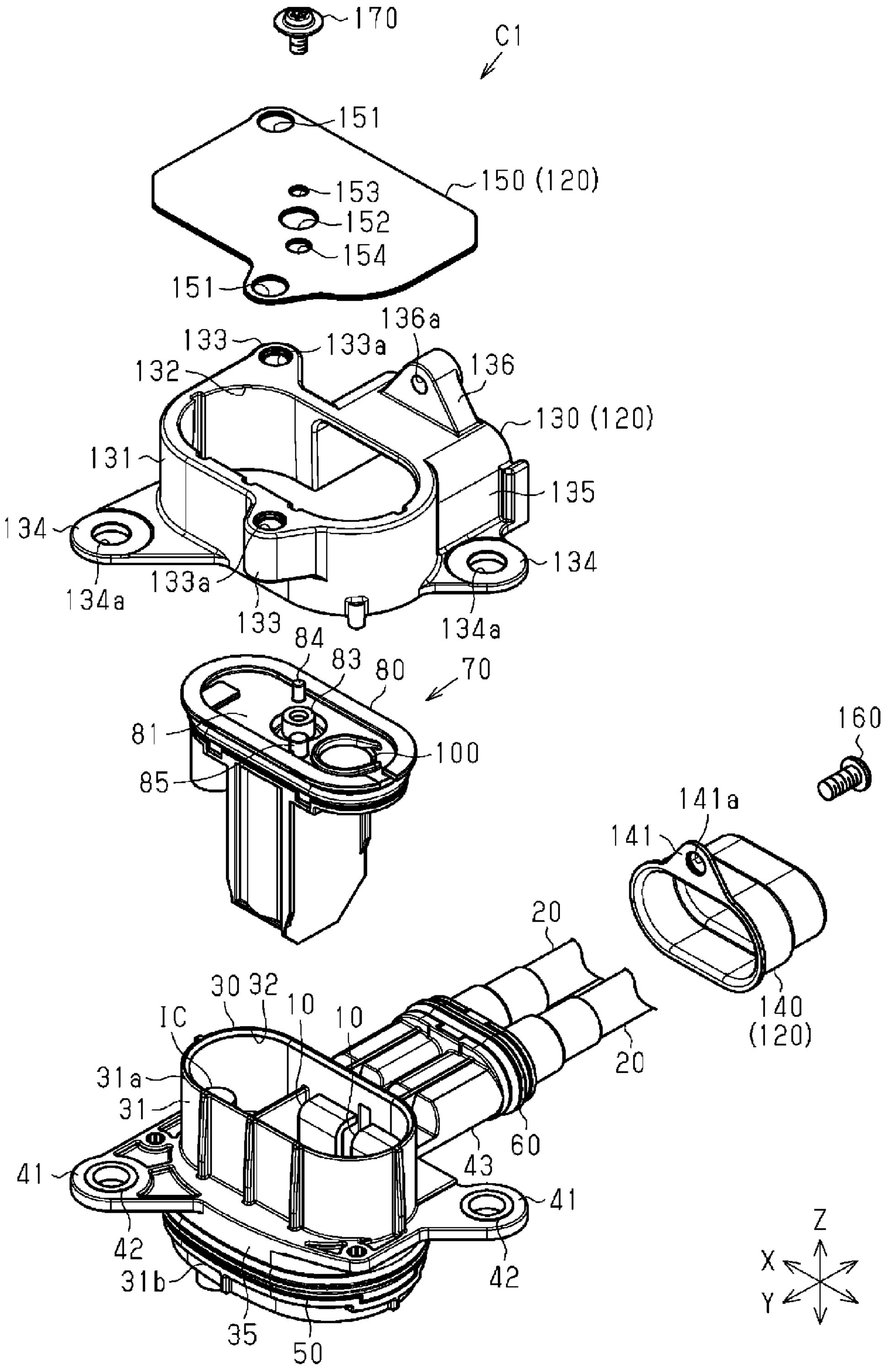
FIG. 3 is an exploded perspective view of the connector.

As shown in FIG. 3, the connector C1 is provided with a plurality of terminals 10, a plurality of wires 20, a housing 30, a cover 70 and a shield shell 120. The plurality of terminals 10 are parallel to each other. The plurality of wires 20 are respectively electrically connected to the plurality of terminals 10. The housing 30 holds the plurality of terminals 10 and the plurality of wires 20. The cover 70 covers a part of the housing 30. The shield shell 120 covers parts of the cover 70 and the housing 30.

The connector C1 is, for example, provided with two terminals 10 and two wires 20. Note that the connector C1 may be provided with three or more terminals 10 and three or more wires 20.

Out of X, Y and Z axes of each figure, the X axis extends in a parallel direction of the two terminals 10. The Y axis extends in a longitudinal direction of the wires 20. The Z axis extends in a mounting direction of the case 200 of the electric device M1 and the connector C1. The X, Y and Z axes are orthogonal to each other. A direction along the X axis is referred to as an X-axis direction, a direction along the Y axis is referred to as a Y-axis direction and a direction along the Z axis is referred to as a Z-axis direction below.

The connector C1 is mounted on the case 200, for example, in such a posture that the X-axis direction and a vertical direction coincide. Note that an up-down direction on the plane of each figure does not necessarily coincide with the vertical direction.

(Configuration of Terminal 10)

Figure 4:
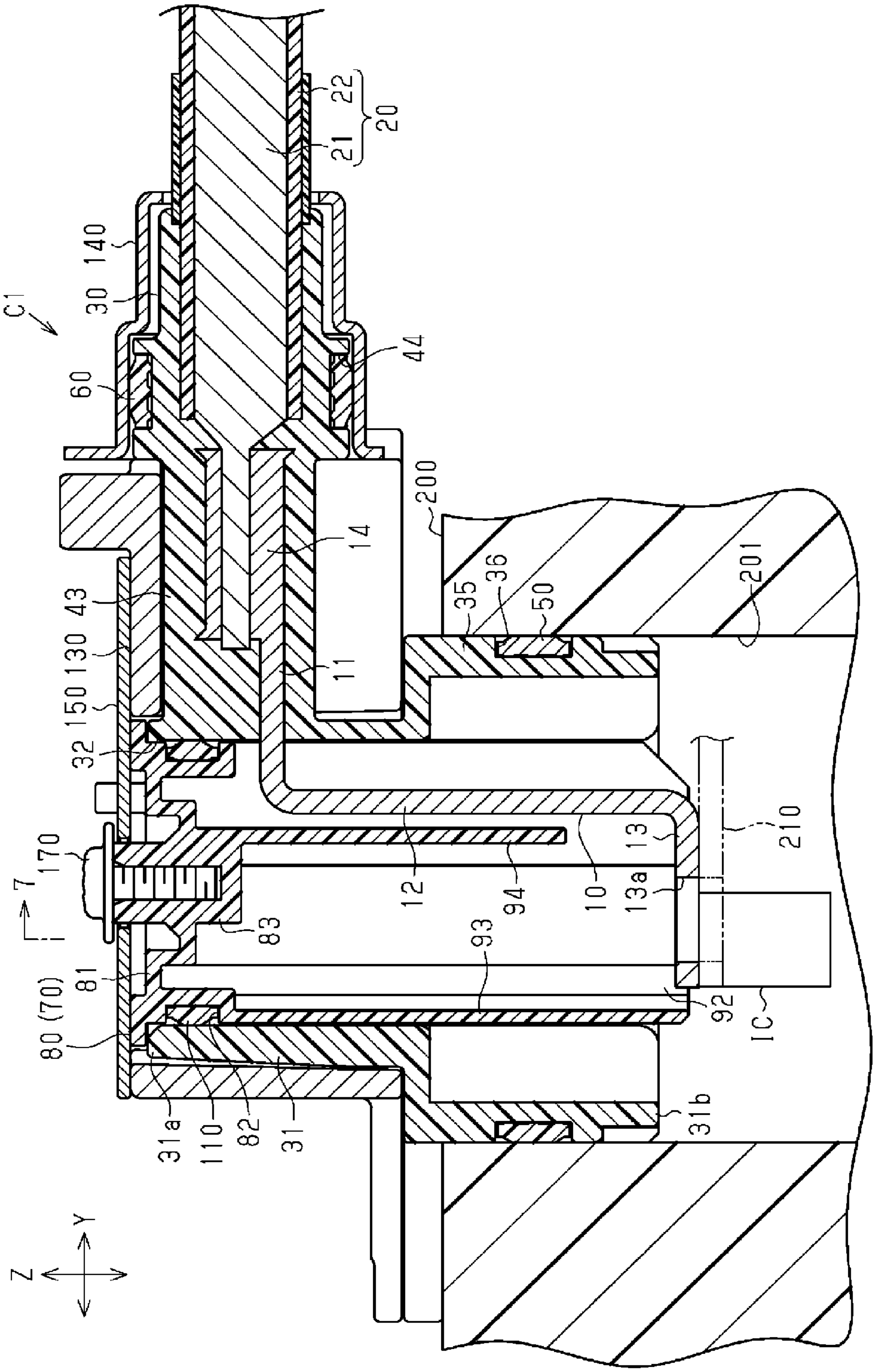
FIG. 4 is a section of the connector.

As shown in FIG. 4, the terminal 10 includes a first extending portion 11, a second extending portion 12 and a third extending portion 13. The terminal 10 is, for example, plate-like. An iron-based, copper-based or aluminum-based metal material can be, for example, cited as a material of the terminal 10.

The first extending portion 11 extends in the Y-axis direction. The first extending portion 11 includes a wire connecting portion 14 to be electrically connected to the wire 20. The wire connecting portion 14 is provided on an end part in the Y-axis direction of the first extending portion 11.

The second extending portion 12 extends in the Z-axis direction from an end part of the first extending portion 11 on a side opposite to the wire connecting portion 14 toward the case 200.

The third extending portion 13 extends toward a side opposite to the first extending portion 11 in an extending direction of the first extending portion 11, i.e. the Y-axis direction, from an end part of the second extending portion 12 on a side opposite to the first extending portion 11. The third extending portion 13 is located outside the housing 30.

The third extending portion 13 is provided with a bolt hole 13*a* penetrating in the Z-axis direction. The third extending portion 13 is electrically connected to a mating terminal 210 provided inside the case 200 by an unillustrated bolt inserted through the bolt hole 13*a*.

(Configuration of Wire 20)

The wire 20 includes a core wire 21 and an insulation coating 22 covering the outer periphery of the core wire 21. A copper-based or aluminum-based metal material can be, for example, cited as a material of the core wire 21. A resin material mainly containing a polyolefin-based resin such as cross-linked polyethylene or cross-linked polypropylene can be cited as a material of the insulation coating 22.

The core wire 21 is, for example, a stranded wire formed by twisting a plurality of metal strands. A cross-sectional shape of the core wire 21 orthogonal to a length direction is, for example, a circular shape.

The core wire 21 is exposed from the insulation coating 22 at an end part of the wire 20. The core wire 21 exposed from the insulation coating 22 is electrically connected to the wire connecting portion 14 of the terminal 10, for example, by crimping.

Figure 5:
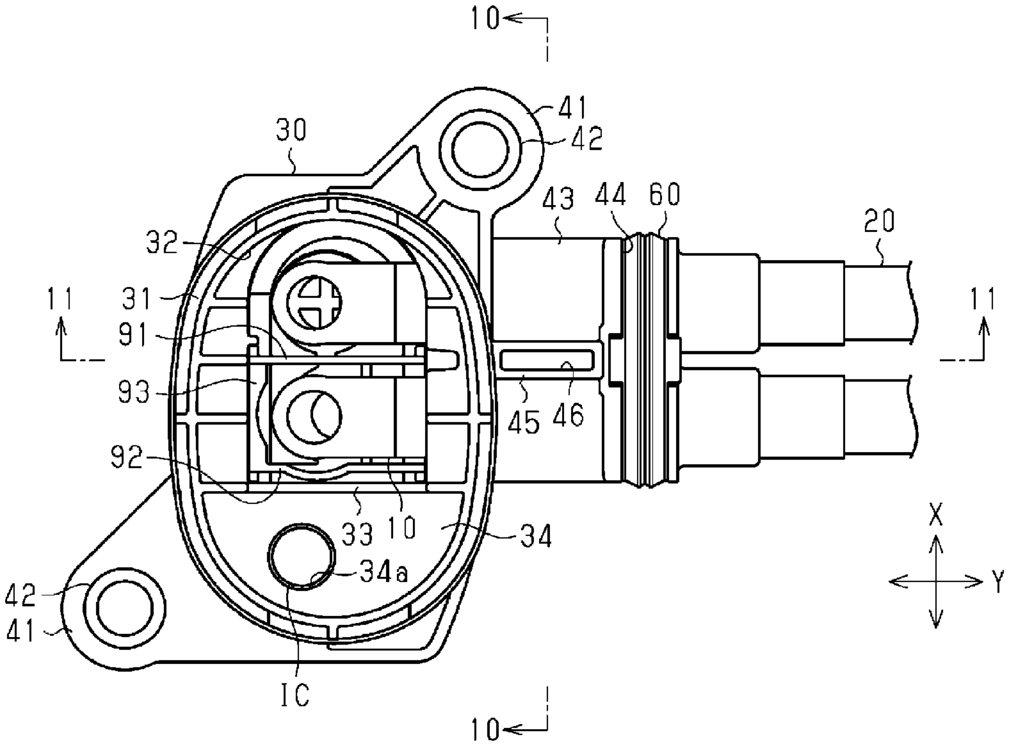
FIG. 5 is a bottom view of a housing.
Figure 6:
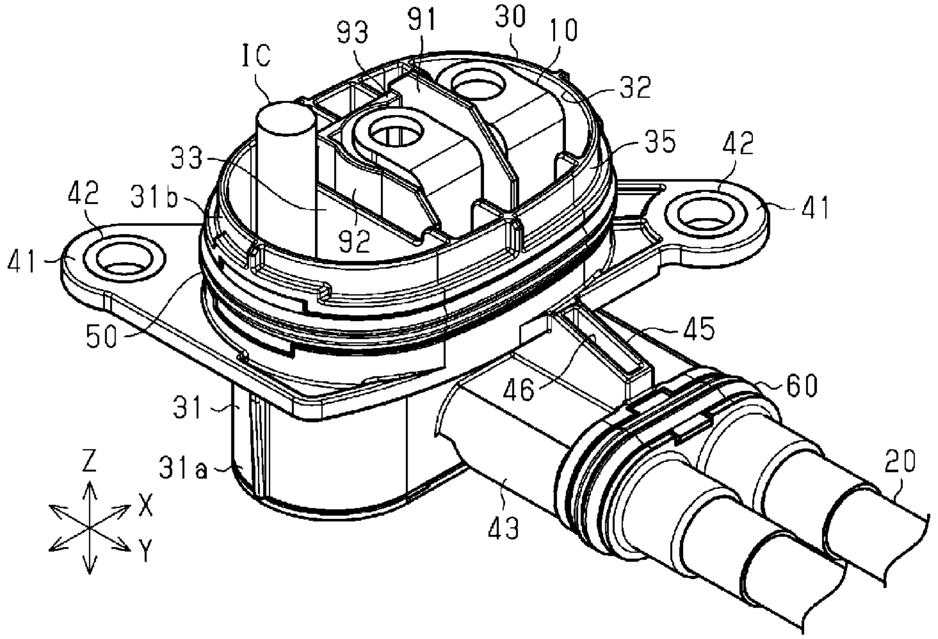
FIG. 6 is a perspective view of the housing.

(Configuration of Housing 30) As shown in FIGS. 5 and 6, the housing 30 includes a tubular portion 31 and a holding portion 43. A resin material such as polybutylene terephthalate (PBT) can be cited as a material of the housing 30.

(Configuration of Tubular Portion 31)

The tubular portion 31 includes an opening 32 through which the two terminals 10 are exposed. The opening 32 penetrates through the tubular portion 31 in the Z-axis direction. An axial direction of the tubular portion 31 coincides with the Z-axis direction. The opening edge of the tubular portion 31 has an elliptical shape long in the X-axis direction when viewed from the Z-axis direction.

An interlock connector IC is provided inside the tubular portion 31. The interlock connector IC is provided in parallel to the two terminals 10 in the X-axis direction.

The interlock connector IC is for electrically detecting whether or not the housing 30 is connected at a proper position with respect to the insertion hole 201 of the case 200. If the housing 30 is connected at the proper position with respect to the case 200, the interlock connector IC is connected to an unillustrated standby connector provided inside the case 200. An interlock circuit is configured by the interlock connector IC and the standby connector. If the interlock connector IC is connected to the standby connector, i.e. if the interlock circuit is closed, the connector C1 and the electric device M1 are in an energizable state.

As shown in FIG. 4, the tubular portion 31 has a first end part 31*a* and a second end part 31*b* located on sides opposite to each other in the Z-axis direction. The first end part 31*a* is a part of the tubular portion 31 on a side on which the cover 70 is mounted. The second end part 31*b* is a part of the tubular portion 31 to be inserted into the insertion hole 201 of the case 200.

Figure 7:
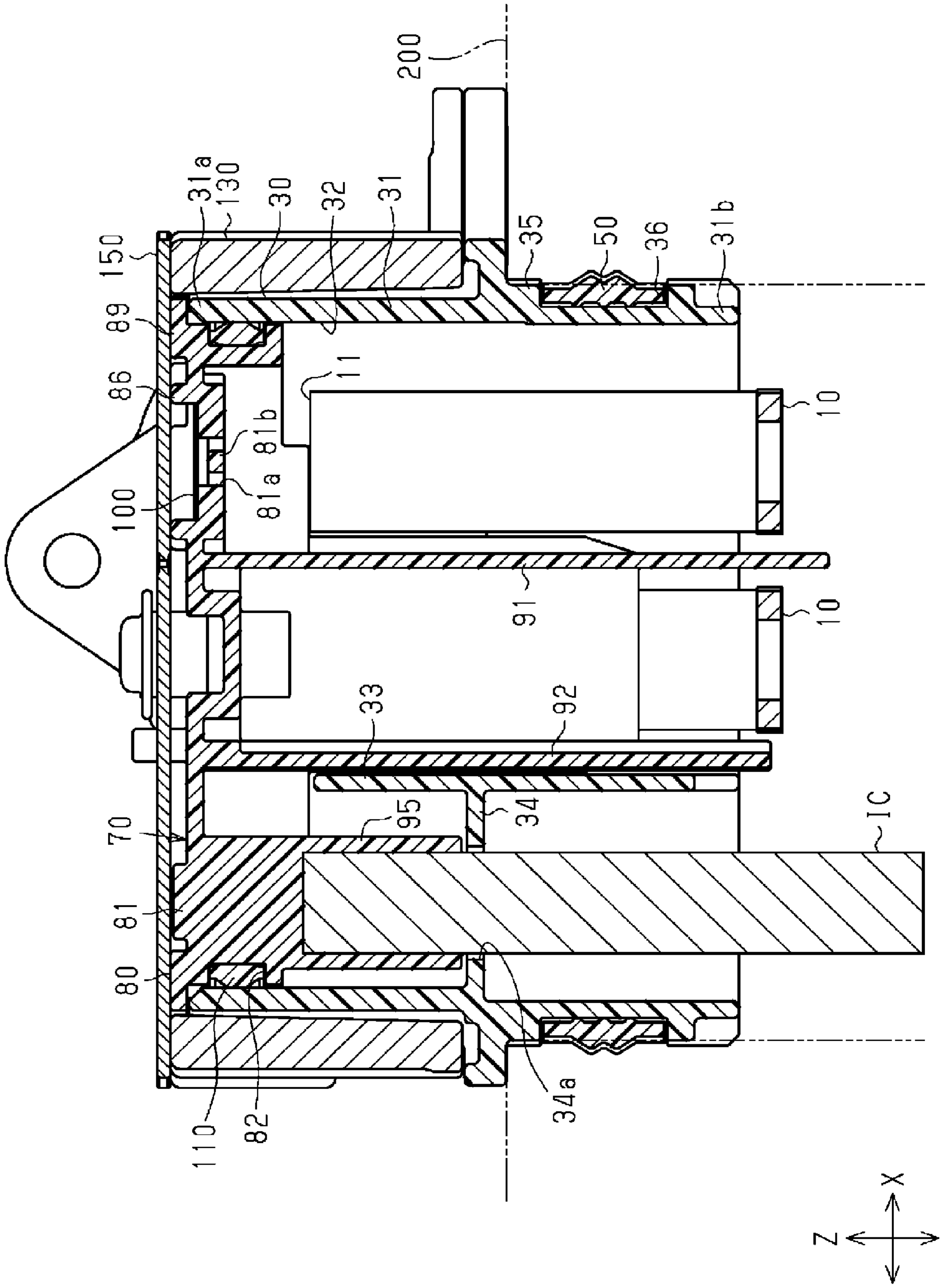
FIG. 7 is a section along 7-7 of FIG. 4.

As shown in FIGS. 5 and 7, the tubular portion 31 includes a first partition wall 33 and a second partition wall 34. The first partition wall 33 corresponds to a "partition wall".

The first partition wall 33 is for partitioning the inside of the tubular portion 31 between the two terminals 10 and the interlock connector IC. The first partition wall 33 extends in the Z-axis direction. The first partition wall 33 couples parts facing each other in the Y-axis direction, out of the inner wall of the tubular portion 31. Therefore, the inside of the tubular portion 31 is partitioned into a part where the two terminals 10 are located and a part where the interlock connector IC is located by the first partition wall 33.

The second partition wall 34 is for partitioning the part where the interlock connector IC is located, out of the inside of the tubular portion 31, in the Z-axis direction. The second partition wall 34 couples the inner wall of the tubular portion 31 and the first partition wall 33.

The second partition wall 34 is provided with an insertion hole 34*a* penetrating in the Z-axis direction. The interlock connector IC is inserted into the insertion hole 34*a*.

Figure 8:
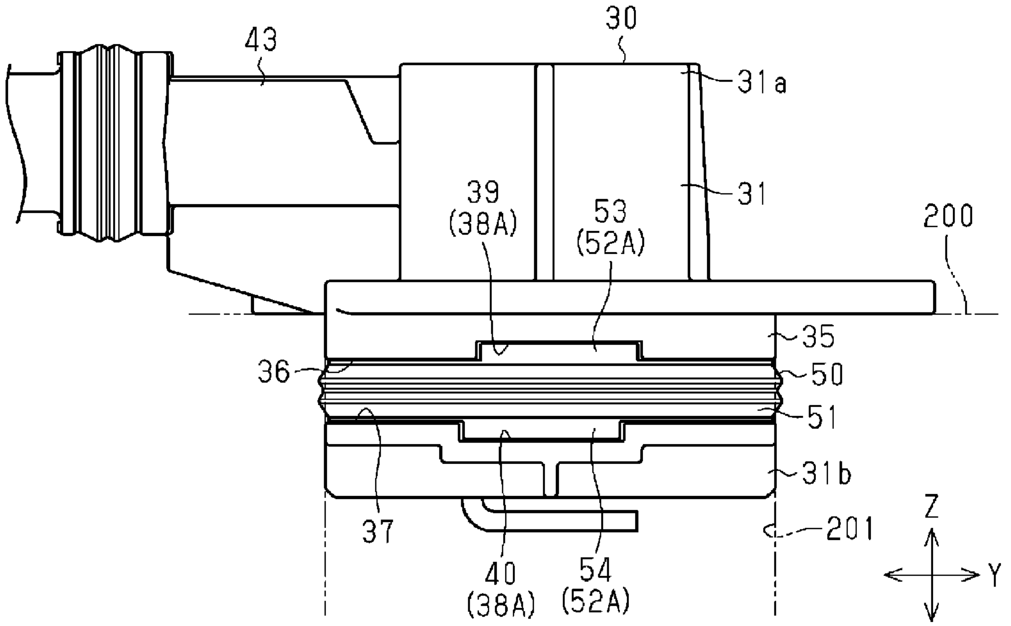
FIG. 8 is a side view of the housing.
Figure 9:
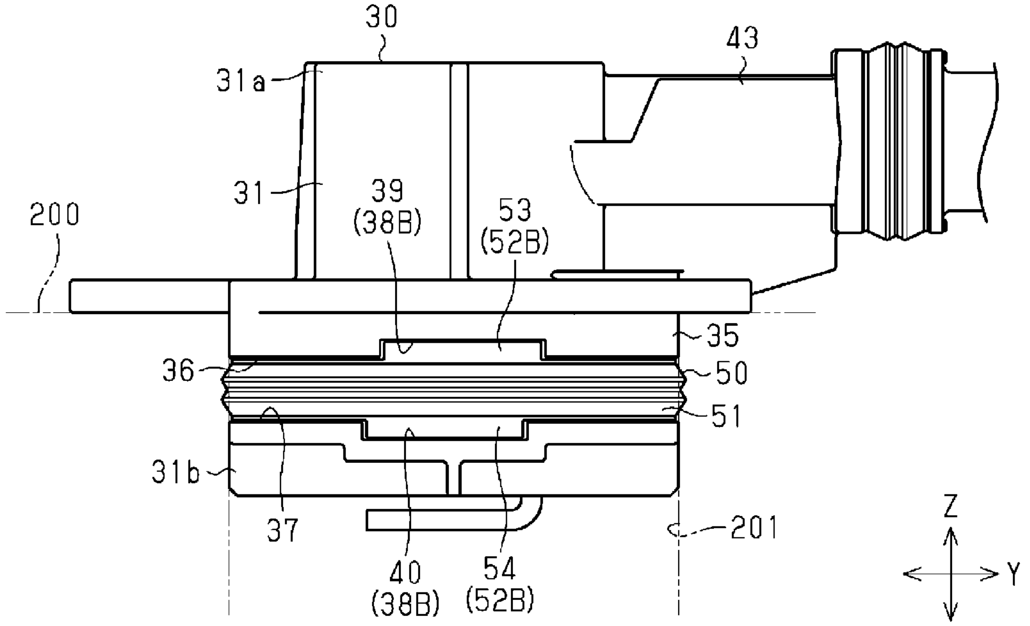
FIG. 9 is a side view of the housing.

As shown in FIGS. 8 and 9, the tubular portion 31 is provided with an inserting portion 35 to be inserted into the insertion hole 201 of the case 200. The inserting portion 35 is a part including the second end part 31*b*, out of the tubular portion 31.

A first accommodation groove 36 is provided over an entire periphery in the outer peripheral surface of the inserting portion 35. An annular first sealing member 50 is accommodated into the first accommodation groove 36. An axial direction of the first sealing member 50 coincides with the Z-axis direction.

A circumferential direction of the first sealing member 50 is merely referred to as a circumferential direction below.

The first accommodation groove 36 includes a groove body 37 and two engaged portions 38A, 38B.

The groove body 37 has an annular shape extending over an entire periphery in the outer peripheral surface of the tubular portion 31.

The two engaged portions 38A, 38B are provided apart from each other in the circumferential direction. The two engaged portions 38A, 38B are located on sides opposite to each other across a center axis of the first sealing member 50. The two engaged portions 38A, 38B are respectively provided on one end and the other end in the X-axis direction of the groove body 37.

Each engaged portion 38A, 38B includes a first engaging groove 39 and a second engaging groove 40. The first and second engaging grooves 39, 40 extend toward sides opposite to each other in the Z-axis direction. The first engaging groove 39 extends from the groove body 37 toward a side where the first end part 31*a* is located in the Z-axis direction. The second engaging groove 40 extends from the groove body 37 toward a side where the second end part 31*b* is located in the Z-axis direction. The first and second engaging grooves 39, 40 have the same shape.

The first and second engaging grooves 39, 40 are provided at positions overlapping each other in the Z-axis direction. The first engaging groove 39 extends more toward one side in the circumferential direction than the second engaging groove 40. The second engaging groove 40 extends more toward the other side in the circumferential direction than the first engaging groove 39.

"One side in the circumferential direction" in this embodiment means a counterclockwise direction when the second end part 31*b* is viewed from the first end part 31*a* of the tubular portion 31 in the Z-axis direction, and the "other side in the circumferential direction" means a clockwise direction.

The first engaging groove 39 of the engaged portion 38A and the second engaging groove 40 of the engaged portion 38B are provided at the same position in the Y-axis direction. The first engaging groove 39 of the engaged portion 38B and the second engaging groove 40 of the engaged portion 38A are provided at the same position in the Y-axis direction.

As shown in FIGS. 5 and 6, the tubular portion 31 includes two fixing portions 41 projecting toward an outer peripheral side of the tubular portion 31. The two fixing portions 41 project toward sides opposite to each other in a direction intersecting both the X-axis direction and Y-axis direction in an XY plane. Each fixing portion 41 is provided with a tubular collar 42 made of metal. Each collar 42 penetrates in the Z-axis direction.

(Configuration of Holding Portion 43)

As shown in FIG. 4, the holding portion 43 projects from the first end part 31*a* of the tubular portion 31 toward the outer peripheral side of the tubular portion 31, more specifically toward one side in the Y-axis direction. The holding portion 43 holds the two terminals 10 and the two wires 20. End parts of the wires 20, the wire connecting portions 14 and parts of the first extending portions 11 are embedded in the holding portion 43. The two terminals 10, the two wires 20 and the housing 30 are integrated by insert molding. Each wire 20 is pulled out from the holding portion 43 toward the one side in the Y-axis direction.

A second accommodation groove 44 is provided over an entire periphery in the outer peripheral surface of the holding portion 43. An annular second sealing member 60 is accommodated into the second accommodation groove 44.

(Configuration of Rib 45)

As shown in FIG. 6, the housing 30 includes a rib 45 coupling the outer surface of the holding portion 43 and the outer surface of the tubular portion 31. The rib 45 is provided on a side where the second end part 31*b* is located when viewed from the holding portion 43.

Figure 10:
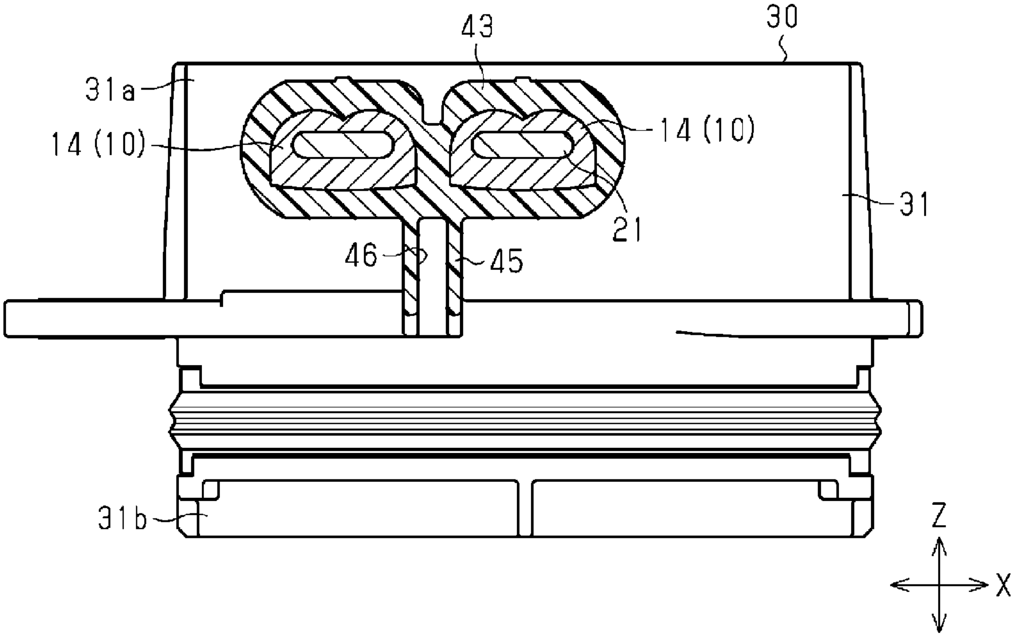
FIG. 10 is a section along 10-10 of FIG. 5 of the housing.

As shown in FIG. 10, the rib 45 projects from the outer surface of a part of the holding portion 43 located between the two terminals 10 adjacent to each other. That is, the rib 45 is located between the two terminals 10 in the X-axis direction. The rib 45 is provided at a position deviated toward one side in the X-axis direction from a central part in the X-axis direction of the outer surface of the tubular portion 31.

Figure 11:
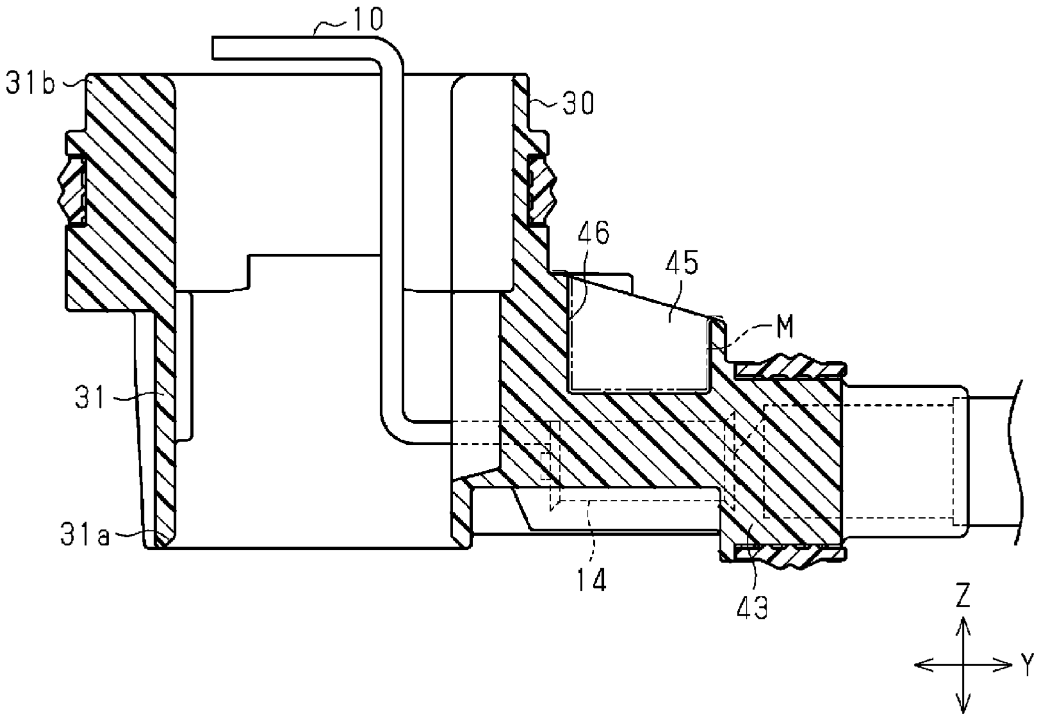
FIG. 11 is a section along 11-11 of FIG. 5 of the housing.

As shown in FIG. 11, the rib 45 is provided at a position overlapping the two wire connecting portions 14 in the Y-axis direction. Therefore, the rib 45 projects from the outer surface of a part of the holding portion 43 located between the two wire connecting portions 14 adjacent to each other.

The rib 45 includes a recess 46. The recess 46 is recessed in a direction from the second end part 31*b* toward the first end part 31*a* along the Z-axis direction. A cross-sectional shape of the recess 46 orthogonal to the Z-axis direction is, for example, a rectangular shape long in the Y-axis direction. This cross-sectional shape is the same over the entire recess 46 in the Z-axis direction. That is, the inner wall of the rib 45 forming the recess 46 extends in the Z-axis direction over the entire periphery of the recess 46. As shown by a two-dot chain line in FIG. 11, the recess 46 is so configured that a mold M used during the injection-molding of the housing 30 is insertable thereinto.

A projecting amount of the rib 45 from the outer surface of the holding portion 43 decreases with distance from the tubular portion 31 in the Y-axis direction.

(Configuration of First Sealing Member 50)

Figure 12:
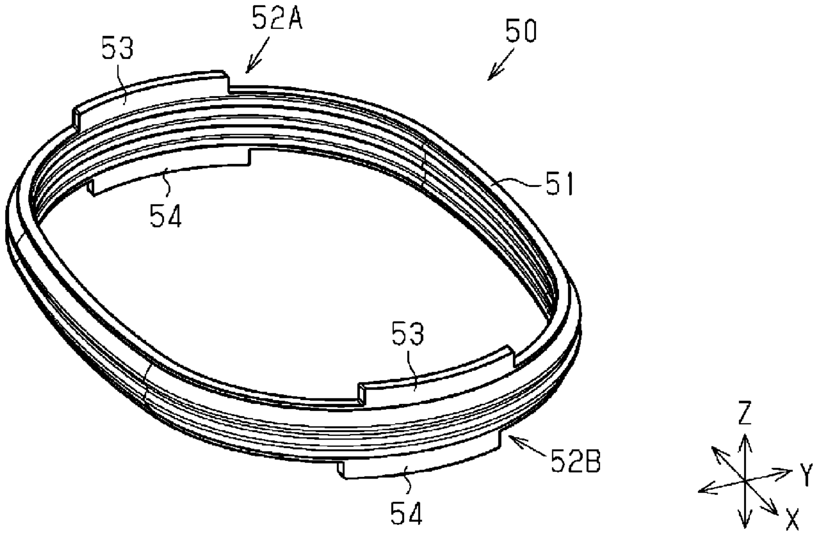
FIG. 12 is a perspective view of a first sealing member.

As shown in FIG. 12, the first sealing member 50 includes a sealing body 51 and two engaging portions 52A, 52B.

The sealing body 51 has an annular shape long in the X-axis direction. The sealing body 51 is provided with lips projecting toward an outer peripheral side over an entire periphery. The sealing body 51 is accommodated into the groove body 37 of the first accommodation groove 36.

The two engaging portions 52A, 52B are provided apart from each other in the circumferential direction. The two engaging portions 52A, 52B are located on sides opposite to each other across the center axis of the first sealing member 50. The two engaging portions 52A, 52B are respectively provided on one end and the other end in the X-axis direction of the sealing body 51.

As shown in FIGS. 8 and 9, each engaging portion 52A, 52B includes a first engaging projection 53 and a second engaging projection 54. The first and second engaging projections 53, 54 project from the sealing body 51 toward sides opposite to each other in the Z-axis direction. The first engaging projection 53 extends from the sealing member 51 toward the side where the first end part 31*a* is located in the Z-axis direction. The second engaging projection 54 extends from the sealing member 51 toward the side where the second end part 31*b* is located in the Z-axis direction. The first and second engaging projections 53, 54 have the same shape.

The first and second engaging projections 53, 54 are provided at positions overlapping each other in the Z-axis direction. The first engaging projection 53 projects more toward one side in the circumferential direction than the second engaging projection 54. The second engaging projection 54 projects more toward the other side in the circumferential direction than the first engaging projection 53. The first and second engaging projections 53, 54 are respectively engaged with the first and second engaging grooves 39, 40.

The first engaging projection 53 of the engaging portion 52A and the second engaging projection 54 of the engaging portion 52B are provided at the same position in the Y-axis direction. The first engaging projection 53 of the engaging portion 52B and the second engaging projection 54 of the engaging portion 52A are provided at the same position in the Y-axis direction.

From the above, the sealing member 50 is shaped to be point symmetric with each of the X, Y and Z axes as an axis of symmetry. That is, if the first sealing member 50 is inverted with each of the X, Y and Z axes as a center axis, the shapes of the first sealing member 50 before and after inversion overlap each other.

By accommodating the first sealing member 50 into the first accommodation groove 36, water is stopped between the inserting portion 35 and the insertion hole 201 of the case 200. Note that since the inserting portion 35 is located outside the shield shell 120, the first sealing member 50 is located outside the shield shell 120.

(Configuration of Cover 70)

As shown in FIG. 7, the cover 70 covers the opening 32 of the tubular portion 31 by being inserted into the tubular portion 31 from the first end part 31*a*.

Figure 13:
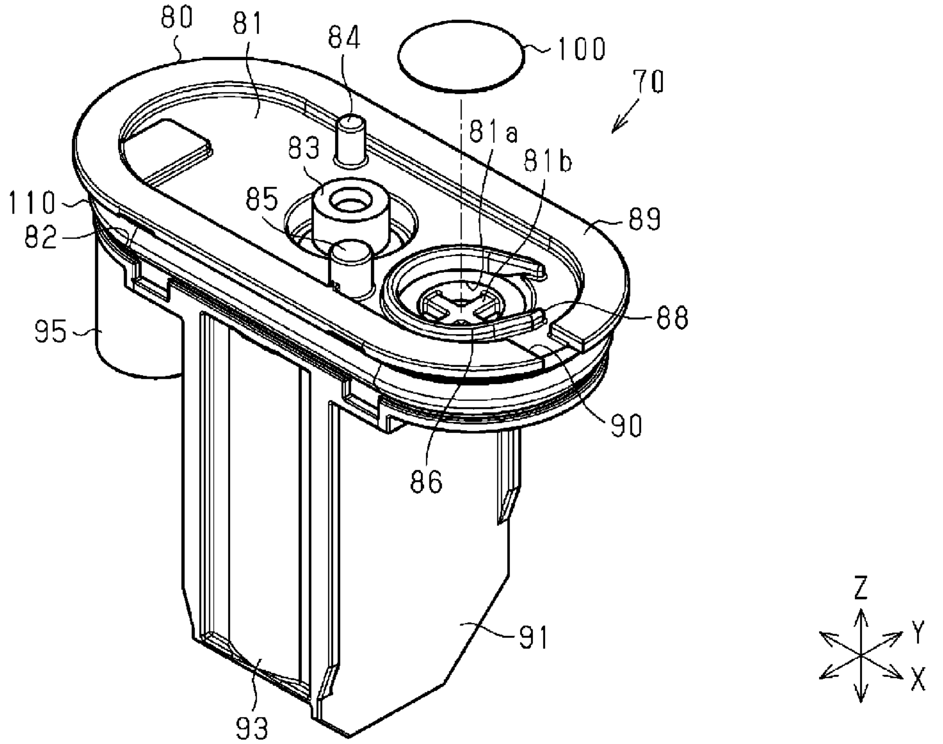
FIG. 13 is an exploded perspective view of a cover.

As shown in FIG. 13, the cover 70 includes a cover body 80 and a breathable film 100. A resin material such as polybutylene terephthalate (PBT) can be cited as a material of the cover body 80. A porous resin material or the like can be cited as a material of the breathable film 100.

The cover body 80 includes a lid portion 81 for covering the opening 32 of the tubular portion 31. The lid portion 81 has an elliptical shape long in the X-axis direction when viewed from the Z-axis direction.

A third accommodation groove 82 is provided over an entire periphery in the outer peripheral surface of the lid portion 81. An annular third sealing member 110 is accommodated into the third accommodation groove 82.

The lid portion 81 includes a vent 81*a* penetrating through the lid portion 81 in the Z-axis direction. The vent 81*a* is provided at a position deviated toward one side in the X-axis direction from a central part of the lid portion 81.

The breathable film 100 covers the vent 81*a* from a side opposite to the two terminals 10 in the Z-axis direction (see FIG. 7). The breathable film 100 has a circular shape when viewed from the Z-axis direction. A diameter of the breathable film 100 is larger than that of the vent 81*a*. The breathable film 100 is, for example, fixed to the lid portion 81 by being fused.

The breathable film 100 is configured to allow the passage of gases such as air and inhibit the passage of liquids such as water. A pressure difference between the inside and outside of the tubular portion 31 is reduced by the breathable film 100.

The vent 81*a* is provided with an X-shaped partitioning portion 81*b* partitioning the vent 81*a*. The touch of worker's fingers with the breathable film 100 through the vent 81*a* is suppressed by the partitioning portion 81*b* of the vent 81*a*.

As shown in FIG. 7, a gap is provided in the Z-axis direction between the breathable film 100 and the partitioning portion 81*b*. Since the breathable film 100 is less likely to be closed by the partitioning portion 81*b* due to this gap, the passage of gasses through the breathable film 100 is less likely to be inhibited.

As shown in FIGS. 3 and 13, the lid portion 81 includes a boss 83 projecting toward the side opposite to the two terminals 10 in the Z-axis direction. The boss 83 projects from a central part of the lid portion 81 in both the X-axis direction and Y-axis direction. The boss 83 has a hollow cylindrical shape having one end closed. The boss 83 is provided with a fastening hole, into which a tap screw 170 including a washer is fastened. The fastening hole is open toward the side opposite to the two terminals 10 in the Z-axis direction.

The lid portion 81 includes a first supporting protrusion 84 and a second supporting protrusion 85. Each supporting protrusion 84, 85 projects toward the side opposite to the two terminals 10 in the Z-axis direction. The first and second supporting protrusions 84, 85 are located on sides opposite to each other across the boss 83 in a direction intersecting both the X-axis direction and Y-axis direction in an XY plane. The first supporting protrusion 84 is located on a side where the holding portion 43 is located in the Y-axis direction when viewed from the boss 83.

Each supporting protrusion 84, 85 has a cylindrical shape. A diameter of the first supporting protrusion 84 is smaller than that of the second supporting protrusion 85.

As shown in FIG. 13, the lid portion 81 includes an inner wall 86 and an outer wall 89 respectively projecting in the Z-axis direction. The inner wall 86 surrounds the outer periphery of the breathable film 100. The outer wall 89 is located on an outer peripheral side of the inner wall 86 and forms the outer peripheral edge of the cover body 80. That is, the outer wall 89 includes the outer peripheral edge of the cover body 80.

The end surfaces in the Z-axis direction of the inner wall 86 and the outer wall 89 are flush with each other. Note that the aforementioned boss 83 and first and second supporting protrusions 84, 85 project beyond the end surfaces in the Z-axis direction of the inner wall 86 and the outer wall 89.

The outer peripheral edge of the outer wall 89 is located radially outward of the opening 32 of the tubular portion 31. The outer wall 89 covers an end surface in the Z-axis direction of the first end part 31*a* of the tubular portion 31 (see FIG. 7).

The inner wall 86 includes an inner discharge port 88 allowing communication between the inside and outside of the inner wall 86 in a direction orthogonal to the Z-axis direction. The outer wall 89 includes an outer discharge port 90 allowing communication between the inside and outside of the outer wall 89 in a direction orthogonal to the Z-axis direction. The inner and outer discharge ports 88, 90 are oriented in mutually different directions. The entire inner discharge port 88 is facing the inner peripheral surface of the outer wall 89. The entire outer discharge port 90 is facing the outer peripheral surface of the inner wall 86.

A virtual axis extending in a communicating direction of the inner discharge port 88 is referred to as a first virtual axis L1, and a virtual axis extending in a communicating direction of the outer discharge port 90 is referred to as a second virtual axis L2. Further, an intersection of the first and second vertical axes L1, L2 is referred to as an intersection P.

Figure 14:
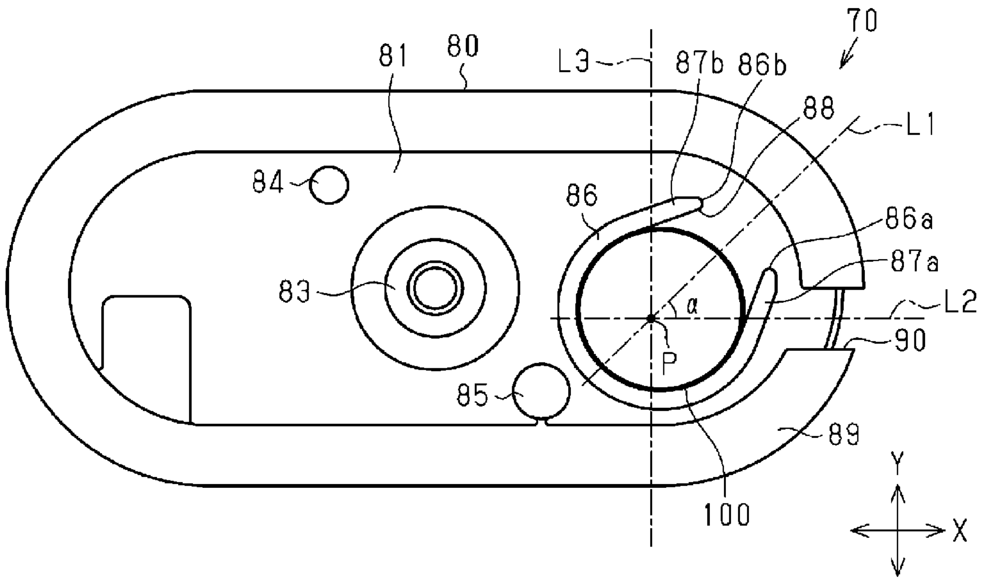
FIG. 14 is a plan view of the cover.

As shown in FIG. 14, the second virtual axis L2 extends in the X-axis direction. The first virtual axis L1 extends obliquely to the second virtual axis L2 in the XY plane. An angle α between the first and second virtual axes L1, L2 is an acute angle.

The entire inner discharge port 88 is closer to a side where the outer discharge port 90 is located than the intersection P in an axial direction of the second virtual axis L2, i.e. the X-axis direction. In other words, the entire inner discharge port 88 is located closer to the side where the outer discharge port 90 is located than a third virtual axis L3 extending in the Y-axis direction and passing through the intersection P.

If the outer discharge port 90 is oriented in a direction of 6 o'clock, the inner discharge port 88 is preferably oriented, for example, to a region between 3 o'clock and 9 o'clock. However, a case where the entire inner discharge port 88 is not facing the inner peripheral surface of the outer wall 89 is excluded.

The inner wall 86 has a first end edge 86*a* and a second end edge 86*b* forming the inner discharge port 88. The first end edge 86*a* is located closer to the outer discharge port 90 than the second end edge 86*b*.

The inner wall 86 is provided with a first extending portion 87*a* extending to include the first end edge 86*a* and a second extending portion 87*b* extending to include the second end edge 86*b*. The first and second extending portions 87*a*, 87*b* are facing each other. The first extending portion 87*a* corresponds to an "extending portion".

A part of the inner wall 86 except the first and second extending portions 87*a*, 87*b* forms, for example, an arcuate shape along the outer peripheral edge of the breathable film 100. The first and second extending portions 87*a*, 87*b* extend, for example, straight. The first and second extending portions 87*a*, 87*b* extend to approach each other toward the inner discharge port 88.

The first extending portion 87*a* extends obliquely to the second virtual axis L2 to approach the outer discharge port 90 in the axial direction of the second virtual axis, i.e. the X-axis direction, toward the first end edge 86*a*.

Figure 15:
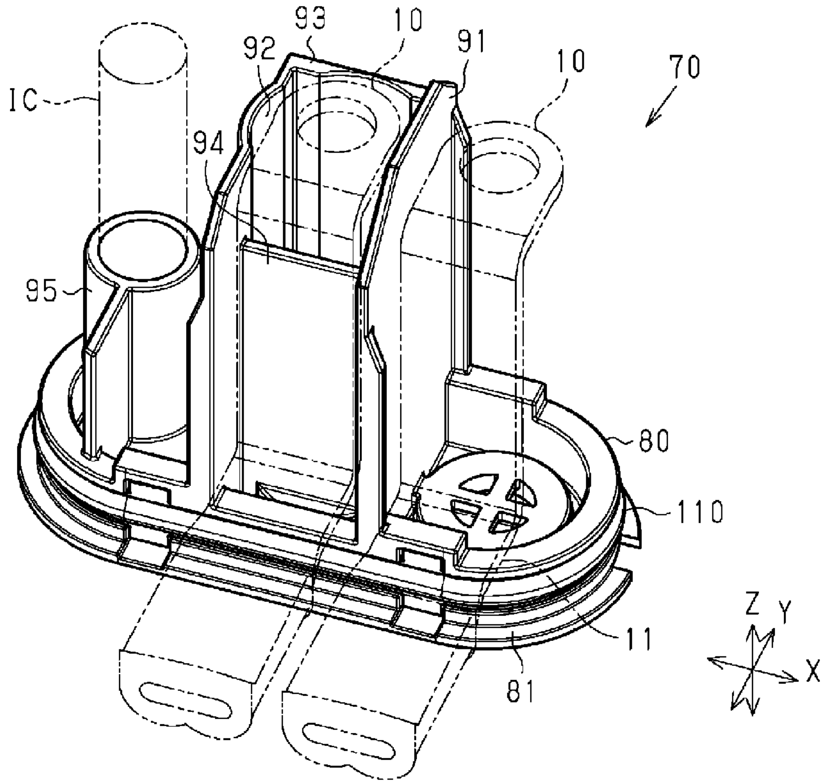
FIG. 15 is a perspective view of the cover.

As shown in FIG. 15, the cover 70 includes a separation wall 91, a facing wall 92, a first coupling wall 93 and a second coupling wall 94 respectively projecting from the lid portion 81 into the tubular portion 31 in the Z-axis direction.

The separation wall 91 is located between the two terminals 10 adjacent to each other. The separation wall 91 extends over the entire lid portion 81 in the Y-axis direction. Parts of the two terminals 10 located inside the opening 32 of the tubular portion 31 are located on sides opposite to each other across the separation wall 91. The separation wall 91 projects to a position beyond the two terminals 10 in the Z-axis direction.

The facing wall 92 is located on a side opposite to the separation wall 91 across one terminal 10. The facing wall 92 is facing the separation wall 91 in the X-axis direction. The facing wall 92 extends substantially over the entire lid portion 81 in the Y-axis direction. A projecting amount of the facing wall 92 from the lid portion 81 is less than that of the separation wall 91 from the lid portion 81.

As shown in FIGS. 4 and 15, the first coupling wall 93 is located on a side opposite to the holding portion 43 across the one terminal 10. The first coupling wall 93 couples the separation wall 91 and the facing wall 92. A projecting amount of the first coupling wall 93 from the lid portion 81 is equal to that of the facing wall 92 from the lid portion 81.

Figure 16:
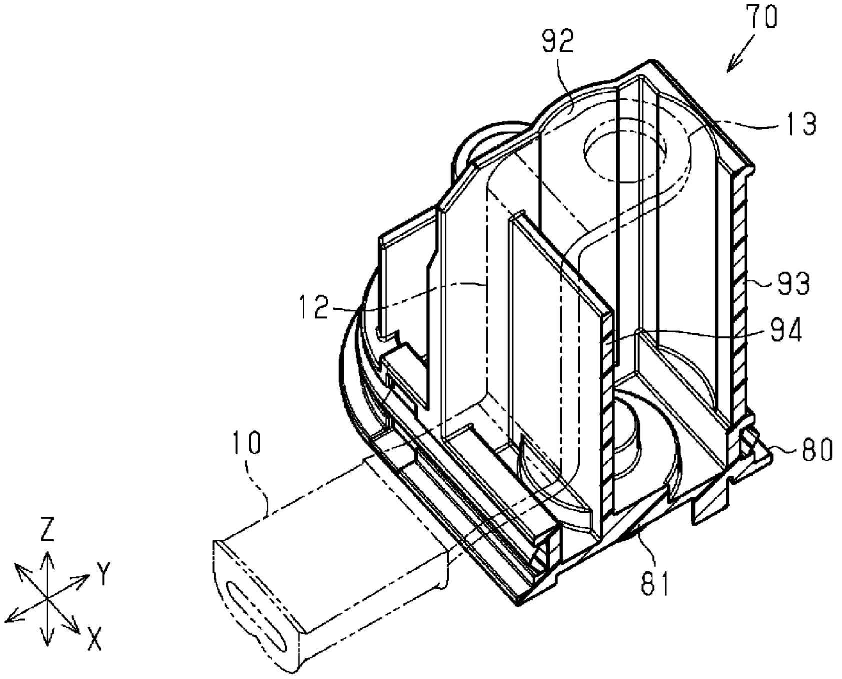
FIG. 16 is a perspective view in section of the cover.

As shown in FIGS. 4 and 16, the second coupling wall 94 is located between the first coupling wall 93 and the second extending portion 12 of the one terminal 10. The second coupling wall 94 couples the separation wall 91 and the facing wall 92. A projecting amount of the second coupling wall 94 from the lid portion 81 is less than that of the first coupling wall 93 from the lid portion 81. A gap is provided between the second coupling wall 94 and the terminal 10 over the entire second coupling wall 94.

Here, the first coupling wall 93 is configured to restrict the insertion of the cover 70 into the tubular portion 31 by contacting the first extending portion 11 of the terminal 10 if the cover 70 is inserted into the tubular portion 31 while being inverted about a center axis of the tubular portion 31 with respect to a proper posture. In this embodiment, the projecting amount of the first coupling wall 93 from the lid portion 81 is larger than a distance from the lid portion 81 to the first extending portion 11 in the Z-axis direction. In this way, the first coupling wall 93 contacts the first extending portion 11 if the cover 70 is inserted in the inverted state into the tubular portion 31.

As shown in FIGS. 7 and 15, the cover 70 includes an accommodating portion 95 projecting from the lid portion 81 into the tubular portion 31 and configured to accommodate one end of the interlock connector IC. The accommodating portion 95 has a hollow cylindrical shape having one end closed.

A projecting amount of the accommodating portion 95 from the lid portion 81 is less than that of each of the separation wall 91, the facing wall 92, the first coupling wall 93 and the second coupling wall 94 from the lid portion 81 and larger than the distance from the lid portion 81 to the first extending portion 11 of the terminal 10 in the Z-axis direction.

Here, if the cover 70 does not include the first coupling wall 93 and is inserted into the tubular portion 31 while being inverted about the center axis of the tubular portion 31 with respect to the proper posture, the accommodating portion 95 is provided at a position capable of contacting the first extending portion 11 of the terminal 10. That is, the accommodating portion 95 is configured to restrict the insertion of the cover 70 into the tubular portion 31 by contacting the terminal 10 if the cover 70 does not include the first coupling wall 93.

An unillustrated shorting pin is provided inside the accommodating portion 95. By accommodating the interlock connector IC into the accommodating portion 95, unillustrated two terminals provided inside the interlock connector IC are electrically connected via the shorting pin. In this way, the circuit inside the interlock connector IC enters an electrically conductive state.

(Configuration of Shield Shell 120)

As shown in FIGS. 2 and 3, the shield shell 120 includes a first shell 130, a second shell 140 and a third shell 150. An iron-based or aluminum-based metal material can be, for example, cited as a material of each shell 130, 140, 150.

(Configuration of First Shell 130)

As shown in FIG. 3, the first shell 130 includes a first part 131 and a second part 135. The first part 131 covers the outer periphery of a part of the tubular portion 31 on a side opposite to the inserting portion 35. The second part 135 covers the outer periphery of a part of the holding portion 43. The first and second parts 131, 135 are open toward the case 200 in the Z-axis direction.

The first shell 130 includes an opening 132, into which the tubular portion 31 is inserted. The opening 132 has an elliptical shape long in the X-axis direction when viewed from the Z-axis direction.

Figure 17:
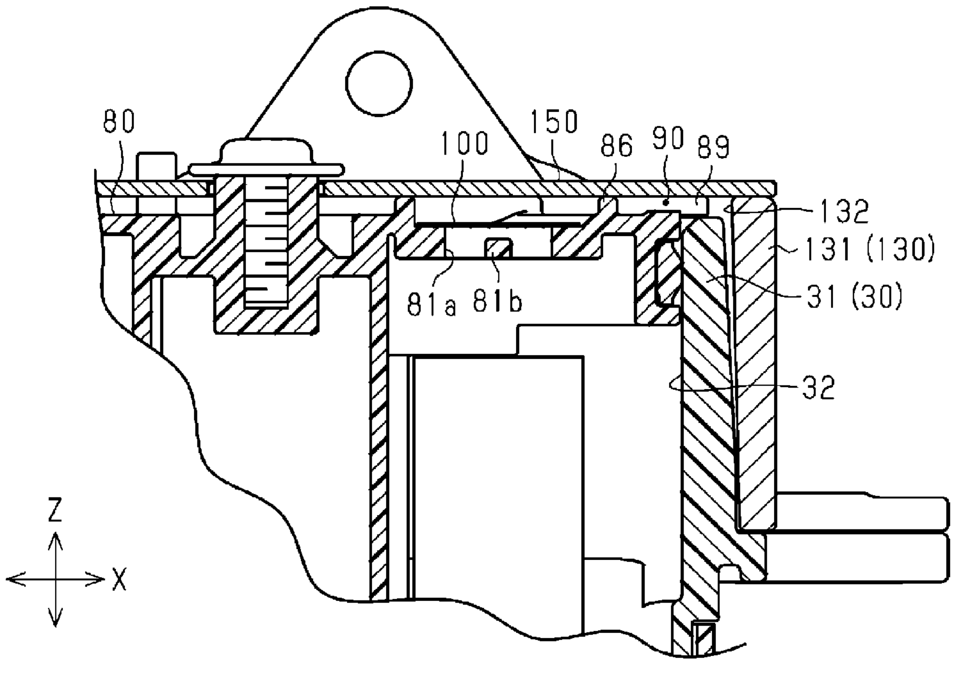
FIG. 17 is a section of the connector.

As shown in FIG. 17, the first part 131 covers the outer discharge port 90 of the cover body 80 from an outer peripheral side of the outer wall 89.

As shown in FIG. 3, the first part 131 includes two fixing projections 133 projecting toward an outer peripheral side of the opening 132. Each fixing projection 133 is provided with a screw hole 133*a* penetrating in the Z-axis direction.

The first part 131 includes two fixing portions 134 projecting toward the outer peripheral side of the opening 132. The two fixing portions 134 are provided at positions respectively corresponding to the two fixing portions 41 of the housing 30. Each fixing portion 134 is provided with a through hole 134*a* penetrating in the Z-axis direction. The through hole 134*a* communicates with the collar 42 provided in the fixing portion 41. As shown in FIG. 2, the connector C1 is fixed to the case 200 by fastening unillustrated bolts inserted through the fixing portions 134, 41 into screw holes 202 provided in the case 200.

As shown in FIG. 3, the second part 135 includes a projecting portion 136 projecting toward a side opposite to the holding portion 43 in the Z-axis direction. The projecting portion 136 is provided with a screw hole 136*a* penetrating in the Y-axis direction.

(Configuration of Second Shell 140)

The second shell 140 has a tubular shape. The second shell 140 covers the outer periphery of a part of the holding portion 43 not covered by the second part 135.

The second shell 140 includes a projecting portion 141 projecting toward the side opposite to the holding portion 43 in the Z-axis direction. The projecting portion 141 is provided with a screw hole 141*a* penetrating in the Y-axis direction. The second shell 140 is fixed to the first shell 130 by fastening a bolt 160 inserted through the through hole 141*a* into the screw hole 136*a* of the first shell 130.

Although not shown, a braided member made of metal for collectively covering the two wires 20 is mounted on the outer peripheral surface of the second shell 140 by a crimp ring.

(Configuration of Third Shell 150)

The third shell 150 is in the form of a flat plate extending in an XY plane. The third shell 150 covers the opening 32 of the tubular portion 31 and the opening 132 of the first shell 130. In this way, the cover 70 is covered by the third shell 150 from the side opposite to the case 200 in the Z-axis direction.

As shown in FIG. 7, the third shell 150 is in contact with the end surfaces in the Z-axis direction of the inner wall 86 and the outer wall 89 of the cover body 80.

As shown in FIG. 3, the third shell 150 includes two through holes 151 respectively communicating with the two screw holes 133*a* of the first shell 130. The third shell 150 is fixed to the first shell 130 by unillustrated bolts inserted through the respective through holes 151.

The third shell 150 includes a boss insertion hole 152, into which the boss 83 of the cover 70 is inserted. A diameter of the boss insertion hole 152 is larger than that of the boss 83. The diameter of the boss insertion hole 152 is smaller than that of the washer of the aforementioned tap screw 170. Note that, as shown in FIG. 4, a gap is provided in the Z-axis direction between this washer and the third shell 150.

As shown in FIG. 3, the third shell 150 includes a first insertion hole 153 and a second insertion hole 154, into which the first and second supporting protrusion 84, 85 are respectively inserted. A diameter of the first insertion hole 153 is larger than that of the first supporting protrusion 84. A diameter of the second insertion hole 154 is larger than that of the second supporting protrusion 85.

From the above, gaps are respectively provided between the boss 83 and the boss insertion hole 152, between the first supporting protrusion 84 and the first insertion hole 153 and between the second supporting protrusion 85 and the second insertion hole 154. The third shell 150 is configured to be swingable in a direction orthogonal to the Z-axis direction with respect to the cover 70 within the ranges of these gaps. In this way, the worker can easily align the positions of the through holes 151 and the screw holes 133*a*.

Functions and effects of this embodiment are described.

(1) The cover 70 includes the cover body 80 having the vent 81*a* and the breathable film 100 for covering the vent 81*a*. The cover body 80 includes the inner wall 86 surrounding the outer periphery of the breathable film 100 and the outer wall 89 located on the outer peripheral side of the inner wall 86 and including the outer peripheral edge of the cover body 80. The inner wall 86 includes the inner discharge port 88 allowing communication between the inside and outside of the inner wall 88 in the direction orthogonal to the Z-axis direction. The outer wall 89 includes the outer discharge port 90 allowing communication between the inside and outside of the outer wall 89 in the direction orthogonal to the Z-axis direction. The inner discharge port 88 is facing the inner peripheral surface of the outer wall 89. The outer discharge port 90 is facing the outer peripheral surface of the inner wall 86.

According to this configuration, for example, if a liquid such as water intrudes into the inner peripheral side of the inner wall 86 through the gap between the third shell 150 and the cover 70, this liquid is easily discharged to the outer peripheral side of the inner wall 86 through the inner discharge port 88. Further, if a liquid intrudes into the inner peripheral side of the outer wall 89, this liquid is easily discharged to the outer peripheral side of the outer wall 89 through the outer discharge port 90. Here, the inner discharge port 88 is facing the inner peripheral surface of the outer wall 89, and the outer discharge port 90 is facing the outer peripheral surface of the inner wall 86. Thus, for example, if the liquid intrudes into the inner peripheral side of the outer wall 89 through the outer discharge port 90, this liquid is less likely to directly reach the inner discharge port 88. In this way, the liquid is less likely to intrude into the inner peripheral side of the inner wall 86. From the above, the stay of the liquid on the breathable film 100 can be suppressed.

(2) The entire inner discharge port 88 is provided closer to the side where the outer discharge port 90 is provided than the intersection P of the first and second virtual axes L1, L2 in the axial direction of the second virtual axis L2.

Figure 18:
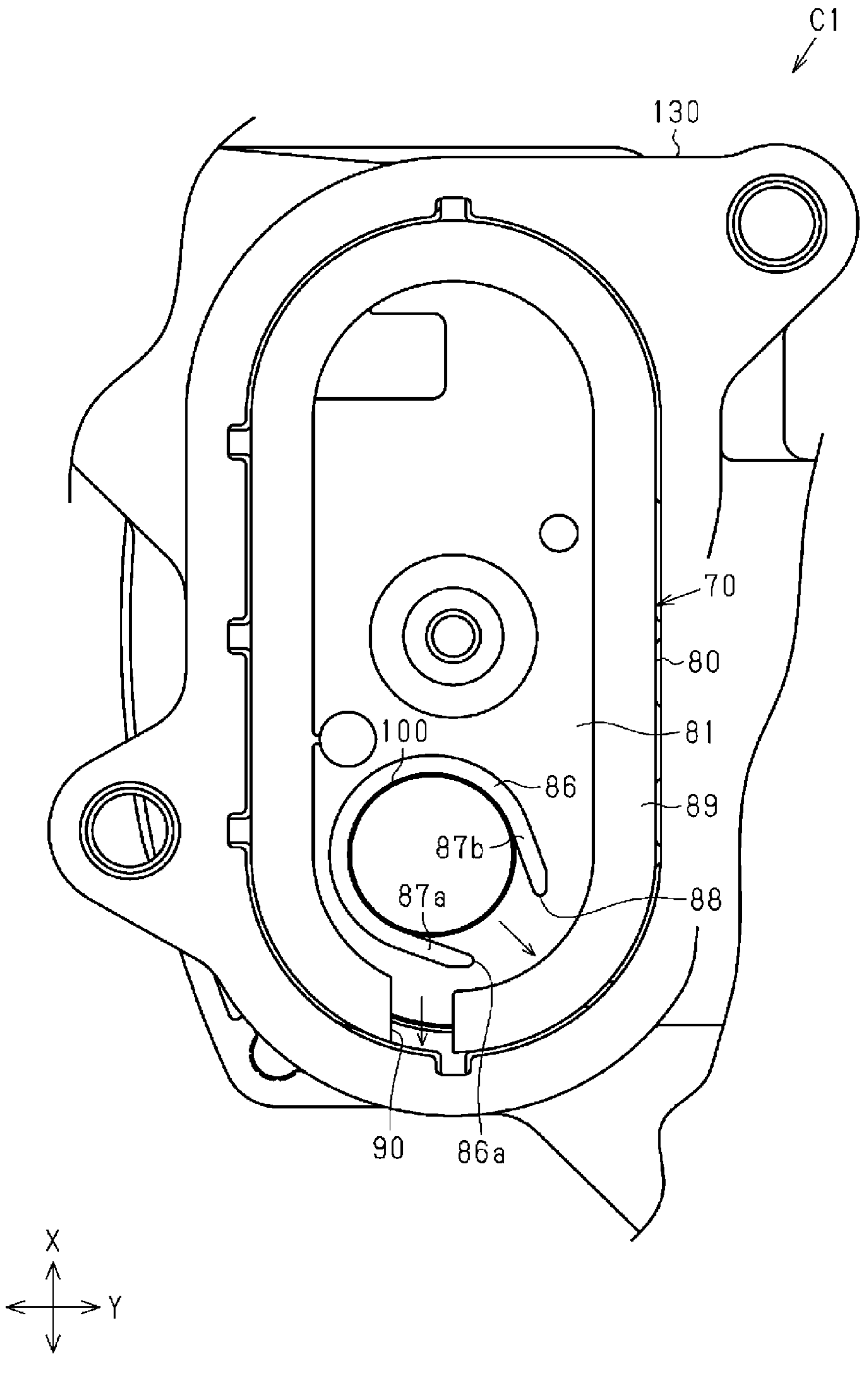
FIG. 18 is a plan view of the connector.

According to this configuration, as shown in FIG. 18, the inner discharge port 88 is open obliquely downward in the connector C1 in which the outer discharge port 90 is arranged to be open downward in the vertical direction. In this way, as indicated by an arrow in FIG. 18, the liquid having intruded into the inner peripheral side of the inner wall 86 is easily discharged to the outer peripheral side of the inner wall 86 through the inner discharge port 88 by the weight thereof. At this time, since the outer discharge port 90 is open downward, the liquid discharged from the inner discharge port 88 is easily discharged to the outer peripheral side of the outer wall 89 through the outer discharge port 90 by the weight thereof. Therefore, an effect of suppressing the stay of the liquid on the breathable film 100 can be made more noticeable.

(3) The first extending portion 87*a* extends obliquely to the second virtual axis L2 to approach the outer discharge port 90 in the axial direction of the second virtual axis L2 toward the first end edge 86*a*.

According to this configuration, the first extending portion 87*a* extends obliquely downward in the connector C1 arranged in such a posture that the outer discharge port 90 is open downward in the vertical direction as in this embodiment. In this way, the liquid having intruded into the inner peripheral side of the inner wall 86 flows obliquely downward along the first extending portion 87*a* after reaching the first extending portion 87*a* by the weight thereof. In this way, the liquid having intruded into the inner peripheral side of the inner wall 86 is easily discharged to the outer peripheral side of the inner wall 86 through the inner discharge port 88. Therefore, the effect of suppressing the stay of the liquid on the breathable film 100 can be made even more noticeable.

(4) The first shell 130 of the shield shell 120 covers the outer discharge port 90 from the outer peripheral side of the outer wall 89.

According to this configuration, the outer discharge port 90 is covered by the first shell 130 from the outer peripheral side of the outer wall 89. In this way, the liquid is less likely to intrude from the outer peripheral side to the inner peripheral side of the outer wall 89 through the outer discharge port 90. Therefore, the liquid can be suppressed from reaching the breathable film 100.

(5) The cover body 80 includes the separation wall 91 located between the two terminals 10 adjacent to each other.

According to this configuration, since the separation wall 91 is located between the two terminals 10 adjacent to each other, these two terminals 10 can be suitably insulated from each other. Further, an insulation distance between the two terminals 10 can be reduced as compared to the case of using the cover body 80 not including the separation wall 91. Therefore, it is possible to suppress an increase in the size of the connector C1 in the parallel direction of the two terminals 10, i.e. the X-axis direction.

(6) The cover body 80 includes the facing wall 92 facing the separation wall 91 and the first coupling wall 93 coupling the separation wall 91 and the facing wall 92. The first coupling wall 93 is configured to restrict the insertion of the cover 70 into the tubular portion 31 by contacting the terminal 10 if the cover 70 is inserted into the tubular portion 31 while being inverted about the center axis of the tubular portion 31 with respect to the proper posture.

According to this configuration, if the cover 70 is inserted into the tubular portion 31 while being inverted about the center axis of the tubular portion 31 with respect to the proper posture, the insertion of the cover 70 into the tubular portion 31 is restricted by the contact of the first coupling wall 93 with the terminal 10. In this way, the worker easily notices the erroneous assembling of the cover 70 with the tubular portion 31.

(7) The cover body 80 includes the second coupling wall 94 located between the first coupling wall 93 and the second extending portion 12 of the terminal 10 and coupling the separation wall 91 and the facing wall 92.

According to this configuration, the separation wall 91 and the facing wall 92 are coupled by both the first coupling wall 93 and the second coupling wall 94. The second coupling wall 94 is located between the first coupling wall 93 and the second extending portion 12 of the terminal 10. From these, the separation wall 91 and the facing wall 92 can be improved in strength while the interference of the second coupling wall 94 and the terminal 10 is avoided.

(8) The housing 30 includes the rib 45 coupling the outer surface of the part of the holding portion 43 located between the two terminals 10 adjacent to each other and the outer surface of the tubular portion 31.

According to this configuration, since the holding portion 43 and the tubular portion 31 are coupled by the rib 45, the tilt of the holding portion 43 with respect to the tubular portion 31 can be suppressed.

(9) The rib 45 includes the recess 46.

According to this configuration, during the injection molding of the housing 30, a part of the mold M is arranged in a space where the recess 46 is to be formed, and the resin material for constituting the housing 30 is filled around this part. Thus, the rib 45 is cooled, for example, by causing a refrigerant to flow inside the part of the mold M. Since the rib 45 can be solidified earlier than other parts in this way, the tilt of the holding portion 43 with respect to the tubular portion 31 can be suppressed. Therefore, a reduction in the dimensional accuracy of the housing 30 can be suppressed.

(10) The interlock connector IC is provided in parallel to the two terminals 10 in the X-axis direction.

According to this configuration, an increase in the size of the housing 30 in the Y-axis direction can be suppressed, for example, as compared to the case where the terminals 10 and the interlock connector IC are arranged in parallel in the Y-axis direction orthogonal to the parallel direction of the two terminals 10.

(11) The tubular portion 31 includes the first partition wall 33 partitioning the inside of the tubular portion 31 between the two terminals 10 and the interlock connector IC.

According to this configuration, since the first partition wall 33 is provided inside the tubular portion 31, an insulation distance between the terminals 10 and the interlock connector IC can be reduced as compared to the case where the first partition wall 33 is not provided. Therefore, an increase in the size of the connector C1 in the X-axis direction can be suppressed.

<Modifications>

This embodiment can be modified and carried out as follows. This embodiment and the following modifications can be carried out in combination without technically contradicting each other.

- The first partition wall 33 may be omitted from the tubular portion 31.
- The accommodating portion 95 may be omitted from the cover body 80.
- The interlock connector IC may be provided in parallel to the terminals 10 in the Y-axis direction.
- The interlock connector IC may be omitted from the connector C1.
- The cross-sectional shape of the recess 46 of the rib 45 orthogonal to the Z-axis direction may be, for example, a circular shape, a polygonal shape or the like.
- The recess 46 may be recessed in an arbitrary direction such as the X-axis direction or Y-axis direction in accordance with a pulling direction of the mold M.
- The rib 45 may include a plurality of recesses 46.
- The recess 46 may be omitted from the rib 45.
- The rib 45 may be provided on a side where the first end part 31*a* is provided when viewed from the holding portion 43.
- The housing 30 may include a plurality of ribs 45.
- The rib 45 may be omitted from the housing 30.
- At least one of the separation wall 91, the facing wall 92, the first coupling wall 93 and the second coupling wall 94 may be omitted from the cover body 80. If the first coupling wall 93 is omitted from the cover body 80, the cover body 80 preferably includes the accommodating portion 95. According to this configuration, if the cover 70 is inserted into the tubular portion 31 while being inverted about the center axis of the tubular portion 31 with respect to the proper position, the accommodating portion 95 contacts the first extending portion 11 of the terminal 10. In this way, the insertion of the cover 70 into the tubular portion 31 is restricted. Thus, the worker easily notices the erroneous assembling of the cover 70 with the tubular portion 31.
- The first shell 130 of the shield shell 120 may not cover the outer discharge port 90 from the outer peripheral side of the outer wall 89. The first shell 130 may include an opening facing the outer discharge port 90.
- The shield shell 120 may be omitted from the connector C1.
- The first and second extending portions 87*a*, 87*b* may be omitted from the inner wall 86. In this case, the inner wall 86 has an arcuate shape as a whole.
- The posture of the connector C1 is not limited to the one of this embodiment. The connector C1 may be used, for example, with the axial direction of the tubular portion 31, i.e. the Z-axis direction, coinciding with the vertical direction.
- If the inner discharge port 88 is facing the inner peripheral surface of the outer wall 89 and the outer discharge port 90 is facing the outer peripheral surface of the inner wall 86, the inner discharge port 88 and the outer discharge port 90 may be oriented in arbitrary directions. In this case, the angle α between the first and second virtual axes L1, L2 may be, for example, an arbitrary angle such as 90°.
- A part of the inner discharge port 88 may be facing the inner peripheral surface of the outer wall 89, and a part of the outer discharge port 90 may be facing the outer peripheral surface of the inner wall 86.

The inner wall 86 may include a plurality of inner discharge ports 88.

The outer wall 89 may include a plurality of outer discharge ports 90.

LIST OF REFERENCE NUMERALS

α angle
B battery
C1, C2 connector
IC interlock connector
L1 first virtual axis
L2 second virtual axis
L3 third virtual axis
M mold
M1 electric device (connection target)
M2 electric device
P intersection
V vehicle
W1, W2 wiring harness
10 terminal
11 first extending portion
12 second extending portion
13 third extending portion
13*a* bolt hole
14 wire connecting portion
20 wire
21 core wire
22 insulation coating
30 housing
31 tubular portion
31*a* first end part
31*b* second end part
32 opening
33 first partition wall (partition wall)
34 second partition wall
34*a* insertion hole
35 inserting portion
36 first accommodation groove
37 groove body
38A, 38B engaged portion
39 first engaging groove
40 second engaging groove
41 fixing portion
42 collar
43 holding portion
44 second accommodation groove
45 rib
46 recess
50 first sealing member
51 sealing body
52A, 52B engaging portion
53 first engaging projection
54 second engaging projection
60 second sealing member
70 cover
80 cover body
81 lid portion
81*a* vent
81*b* partitioning portion
82 third accommodation groove
83 boss
84 first supporting protrusion
85 second supporting protrusion
86 inner wall
86*a* first end edge
86*b* second end edge
87*a* first extending portion (extending portion)
87*b* second extending portion
88 inner discharge port
89 outer wall
90 outer discharge port
91 separation wall
92 facing wall
93 first coupling wall
94 second coupling wall
95 accommodating portion
100 breathable film
110 third sealing member
120 shield shell
130 first shell
131 first part
132 opening
133 fixing projection
133*a* screw hole
134 fixing portion
134*a* through hole
135 second part
136 projecting portion
136*a* screw hole
140 second shell
141 projecting portion
141*a* through hole
150 third shell
151 through hole
152 boss insertion hole
153 first insertion hole
154 second insertion hole
160 bolt
170 tap screw
200 case
201 insertion hole
202 screw hole
210 mating terminal

What is claimed is:

1. A connector, comprising:

a plurality of terminals parallel to each other, a plurality of wires to be respectively connected to the plurality of terminals;

a housing made of resin and including a tubular portion having an opening for exposing end parts of the plurality of terminals and a holding portion projecting from the tubular portion toward an outer peripheral side of the tubular portion, the holding portion holding the plurality of terminals and the plurality of wires; and a cover for covering the opening by being inserted into the tubular portion, the end part of each terminal being provided with a bolt hole, the bolt hole penetrating in an axial direction of the tubular portion, a bolt being inserted into the bolt hole, the cover including:

a cover body made of resin, the cover body having a vent penetrating in the axial direction, the cover body covering the opening; and a breathable film for covering the vent from a side opposite to the plurality of terminals in the axial direction, the breathable film allowing passage of gases and inhibiting passage of liquids, the cover body including an inner wall surrounding an outer periphery of the breathable film and an outer wall located on an outer peripheral side of the inner wall and including an outer peripheral edge of the cover body, the inner wall including an inner discharge port allowing communication between inside and outside of the inner wall in a direction orthogonal to the axial direction, the outer wall including an outer discharge port allowing communication between inside and outside of the outer wall in a direction orthogonal to the axial direction, and the inner discharge port facing an inner peripheral surface of the outer wall, the outer discharge port facing an outer peripheral surface of the inner wall.

2. The connector of claim 1, wherein:

if a virtual axis extending in a communicating direction of the inner discharge port is a first virtual axis and a virtual axis extending in a communicating direction of the outer discharge port is a second virtual axis, the entire inner discharge port is provided closer to a side where the outer discharge port is located than an intersection of the first and second virtual axes in an axial direction of the second virtual axis.

3. The connector of claim 2, wherein:

the inner wall has a first end edge and a second end edge forming the inner discharge port, the first end edge is located closer to the outer discharge port than the second end edge, the inner wall is provided with an extending portion extending to include the first end edge, and the extending portion extends obliquely to the second virtual axis to approach the outer discharge port in the axial direction of the second virtual axis toward the first end edge.

4. The connector of claim 1, comprising a shield shell made of metal, the shield shell covering an outer periphery of the tubular portion, wherein:

the shield shell covers the outer discharge port from an outer peripheral side of the outer wall.

5. The connector of claim 1, wherein the cover body includes a separation wall located between two mutually adjacent ones of the terminals.

6. The connector of claim 5, wherein:

the cover body includes:

a facing wall located on a side opposite to the separation wall across one terminal fitting and facing the separation wall; and a coupling wall located on a side opposite to the holding portion across the one terminal and coupling the separation wall and the facing wall, and the coupling wall is configured to restrict insertion of the cover into the tubular portion by contacting the terminal if the cover is inserted into the tubular portion while being inverted about a center axis of the tubular portion with respect to a proper posture.

7. The connector of claim 6, wherein:

each terminal includes a first extending portion extending from the holding portion toward inside of the tubular portion, a second extending portion extending in the axial direction from the first extending portion and a third extending portion extending from the second extending portion toward a side opposite to the first extending portion in an extending direction of the first extending portion and provided with the bolt hole, and the cover body includes a second coupling wall located between the first coupling wall and the second extending portion and coupling the separation wall and the facing wall when the coupling wall is a first coupling wall.

8. The connector of claim 1, wherein the housing includes a rib coupling an outer surface of a part of the holding portion located between two mutually adjacent ones of the terminals and an outer surface of the tubular portion.

9. The connector of claim 8, wherein the rib includes a recess.

10. The connector of claim 1, comprising an interlock connector provided inside the tubular portion, the interlock connector electrically detecting whether or not the housing is connected to a connection target at a proper position, wherein:

the interlock connector is provided in parallel to the plurality of terminals in a parallel direction of the plurality of terminals.

11. The connector of claim 10, wherein:

the cover body includes an accommodating portion for accommodating one end of the interlock connector, and the accommodating portion is configured to restrict insertion of the cover into the tubular portion by contacting the terminal if the cover is inserted into the tubular portion while being inverted about a center axis of the tubular portion with respect to a proper posture.

12. The connector of claim 10, wherein the tubular portion includes a partition wall partitioning inside of the tubular portion between the plurality of terminals and the interlock connector.

* * * * *